(12) United States Patent
Lee (10) Patent No.: US 9,344,672 B2
(45) Date of Patent: May 17, 2016

(54) MOBILE/PORTABLE TERMINAL (71) Applicant: LG ELECTRONICS INC., Seoul (KR)

(72) Inventor: Gungil Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/762,538

(22) PCT Filed: Jul. 19, 2013

(86) PCT No.: PCT/KR2013/006502
§ 371 (c)(1),
(2) Date: Jul. 22, 2015

(87) PCT Pub. No.: WO2014/119829
PCT Pub. Date: Aug. 7, 2014

(65) Prior Publication Data
US 2015/0381929 A1    Dec. 31, 2015

(30) Foreign Application Priority Data

Feb. 1, 2013    (KR) .......................... 10-2013-0011664

(51) Int. Cl.
    H04N 7/15       (2006.01)
    H04N 7/14       (2006.01)
    H04M 1/02       (2006.01)
    G06F 3/041      (2006.01)
    H04N 5/225      (2006.01)

(52) U.S. Cl.
    CPC ............... H04N 7/142 (2013.01); G06F 3/041 (2013.01); H04M 1/0202 (2013.01); H04M 1/0264 (2013.01); H04N 5/2257 (2013.01); H04N 7/144 (2013.01); G06F 2203/04102 (2013.01); H04N 2007/145 (2013.01)

(58) Field of Classification Search
    CPC .............. G06F 2203/04102; H04M 1/0264; H04N 2007/145; H04N 5/2257
    USPC .................. 348/14.02, 207.11, 208.16
    See application file for complete search history.

(56) References Cited

U.S. PATENT DOCUMENTS

| 8,271,047 B2 | 9/2012 | Kim et al. | |
| 8,502,788 B2 | 8/2013 | Cho | |
| 2015/0365568 A1* | 12/2015 | Topliss | G02B 7/08 348/360 |

FOREIGN PATENT DOCUMENTS

| KR | 10-2007-0094335 A | 9/2007 |
| KR | 10-2010-0052226 A | 5/2010 |
| KR | 10-2010-0052227 A | 5/2010 |
| KR | 10-2011-0133861 A | 12/2011 |
| KR | 10-2013-0083945 A | 7/2013 |

OTHER PUBLICATIONS

International Search Report dated Oct. 18, 2013 issued in Application No. PCT/KR2013/006502.

* cited by examiner

Primary Examiner — Creighton Smith
(74) Attorney, Agent, or Firm — KED & Associates, LLP (57) ABSTRACT

Disclosed is a mobile/portable terminal comprising: a case of which at least a part is flexible; a camera module which is provided on one side of the case to photograph in one direction; a display unit for displaying images photographed by the camera module; a bending unit in which the camera module bends toward another side direction; and a control unit for controlling the camera module according to a change in an angle of the bending unit. The mobile/portable terminal has advantages of being capable of photographing images on both front and rear sides with a single camera so that the number of cameras can be decreased to thereby reduce costs for components, utilizing a mounting space for cameras, and using a camera with a high resolution for self-shooting.

15 Claims, 10 Drawing Sheets

MOBILE/PORTABLE TERMINAL

CROSS-REFERENCE TO RELATED PATENT APPLICATIONS

This application is a U.S. National Stage Application under 35 U.S.C. §371 of PCT Application No. PCT/KR2013/006502, filed Jul. 19, 2013, which claims priority to Korean Patent Application No. 10-2013-0011664, filed Feb. 1, 2013, whose entire disclosures are hereby incorporated by reference.

TECHNICAL FIELD

The present invention relates to a mobile terminal including a flexible main body and a camera module mounted on the flexible main body.

BACKGROUND ART

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

Recently, with the help of development of a flexible display, it is able to implement a flexible mobile terminal. Hence, there exist a difference between a structure of each component such as a case, a camera, a receiver and the like of the flexible mobile terminal and a structure of a legacy mobile terminal. Hence, a method of controlling the flexible mobile terminal is studying in consideration of a shape change of the flexible mobile terminal.

DISCLOSURE OF THE INVENTION

Technical Task

The present invention is proposed to satisfy the aforementioned necessities. An object of the present invention is to provide a mobile terminal capable of controlling a direction of a camera using a flexible body.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a mobile terminal can include a case of which at least a part of the case is flexible, a camera configured to capture one direction in a manner of being mounted on one side of the case, a display unit configured to display an image captured by the camera, a bending unit configured to be bent to make the camera face another direction, and a controller configured to control the camera according to change of an angle of the bending unit.

If the bending unit changes an angle as much as an angle equal to or greater than 90 degrees, the controller can control the image captured by the camera to be stored in a storing unit or to be displayed on the display unit in a manner of reversing the image.

The mobile terminal can further include a user input unit positioned at a rear side of the camera.

If a part of the display unit is blocked by the bending unit as the bending unit is bending, the display unit can display an imaged on a part not blocked by the bending unit only.

The mobile terminal further includes a user input unit configured to receive an input using a touch input mode on the display unit. If the bending unit is bent and blocks a part of the display unit, the user input unit may be disappeared from the display unit.

The display unit is made up of a flexible material and both the case and the display unit can be bent in a manner that the bending unit is overlapped with the display unit.

The display unit can be mounted on another side of the case. If a video call is received and the bending unit is bent to make the camera face another direction, the controller can connect with a counterpart of the video call.

The display unit can be mounted on another side of the case. If a telephone number of a counterpart is inputted and the bending unit is bent to make the camera face another direction, the controller can connect a video call with the counterpart.

If the bending unit is unbent, the video call can be terminated.

If the bending unit is bent, the controller can activate the camera.

The controller can control capturing of the camera to be stopped in the middle of changing the angle of the bending unit.

If a capturing object is moving, the controller can adjust the angle of the bending unit according to the movement of the object.

The bending unit can maintain an angle adjusted by a user.

The bending unit can include a plate spring.

Both the case and the display unit can be made up of a flexible material.

Advantageous Effects

According to the present invention, since it is able to capture both a front image and a rear image using a single camera of a mobile terminal, it is able to reduce component cost by decreasing the number of cameras, utilize a space for mounting a camera and use a camera of high resolution for capturing a selfie.

BEST MODE

Mode for Invention

In the following detailed description, reference is made to the accompanying drawing figures which form a part hereof, and which show by way of illustration various embodiments. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification may also be applicable to a fixed terminal such as a digital TV, a desktop computer and the like as well as a mobile terminal.

Figure 1:
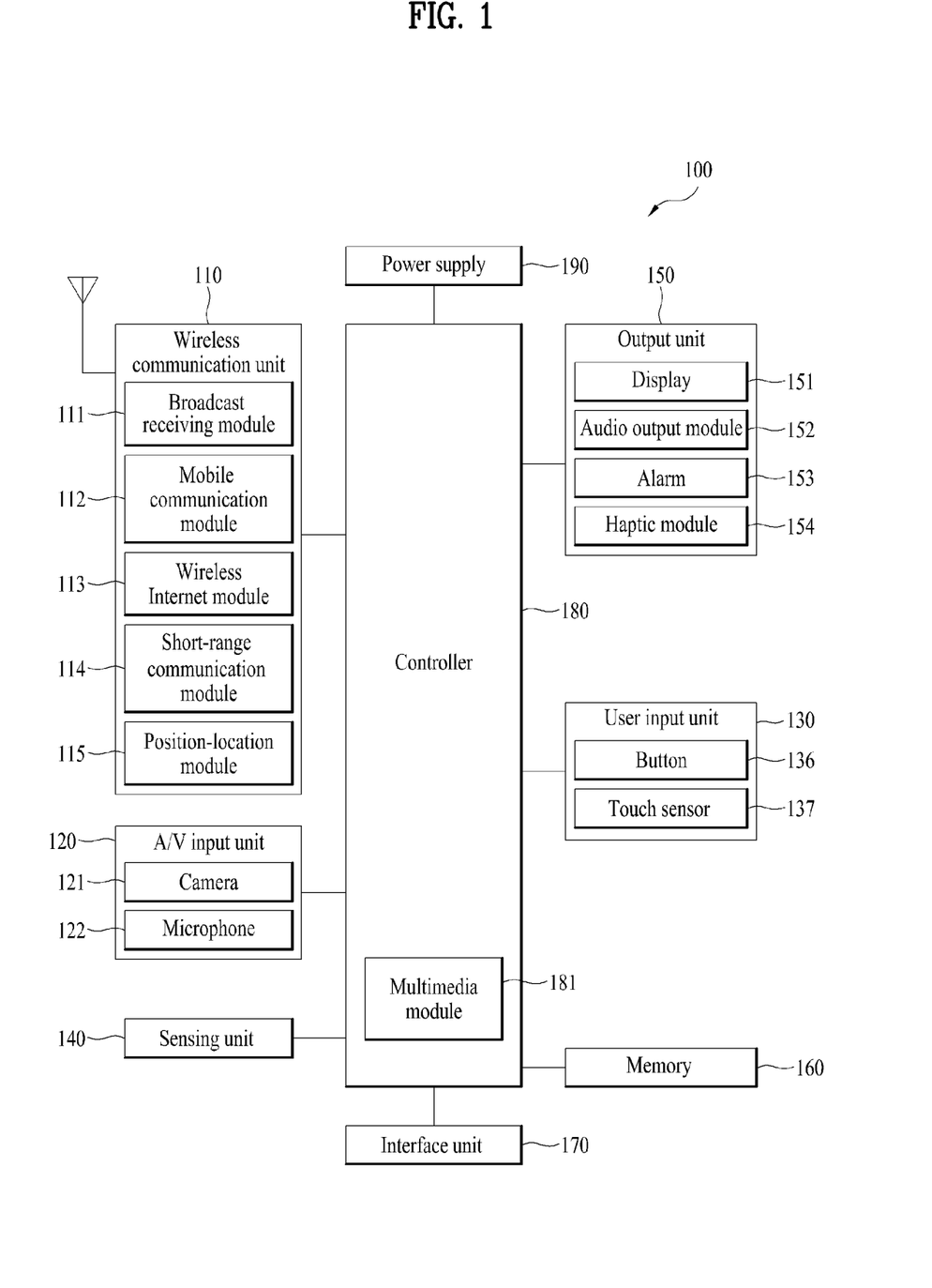
FIG. 1 is a block diagram of a mobile terminal according to an embodiment as broadly described herein.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. The camera 151 is arranged at a front side or a rear side of the mobile terminal and may be able to record an image of a direction at which the camera is arranged.

Since the mobile terminal according to the present invention includes a bending unit 105, the bending unit 105 can be bent to make a camera facing a front side or a rear side face an opposite direction. Regarding the bending unit 105, it shall be described later.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such a sensing unit 140 may include, a gyro sensor, an acceleration sensor, a geomagnetic sensor and the like.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

A flexible display corresponds to a display device capable of being folded or bent. The flexible display uses a flexible plastic board rather than glass. In order to prevent the plastic board from being damaged, it may use a low-temperature manufacturing process unlike a legacy manufacturing process. Since the flexible board uses plastic instead of glass, the flexible board is thin, light, impact-proof and bendable.

At least two displays 151 may be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160.

Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The controller 180 detects information detected by the sensing unit 140 as an input signal and may be able to control the mobile terminal. For instance, the controller detects such information as a slope of the mobile terminal, whether an object is approaching, a shape change of the mobile terminal and the like and may be able to control the mobile terminal according to the detected information.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Figure 2:
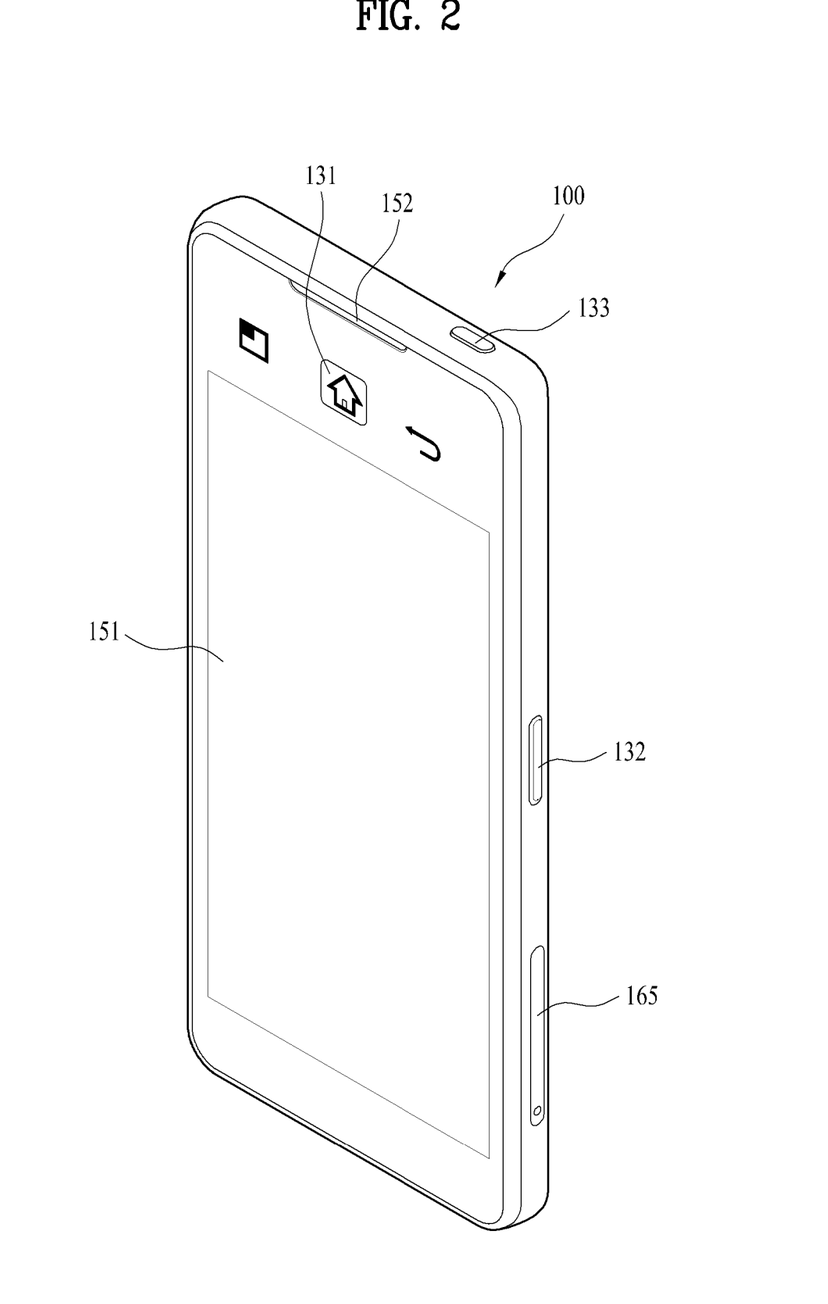
FIG. 2 is a front side perspective diagram for a mobile terminal according to one embodiment of the present invention.
Figure 3:
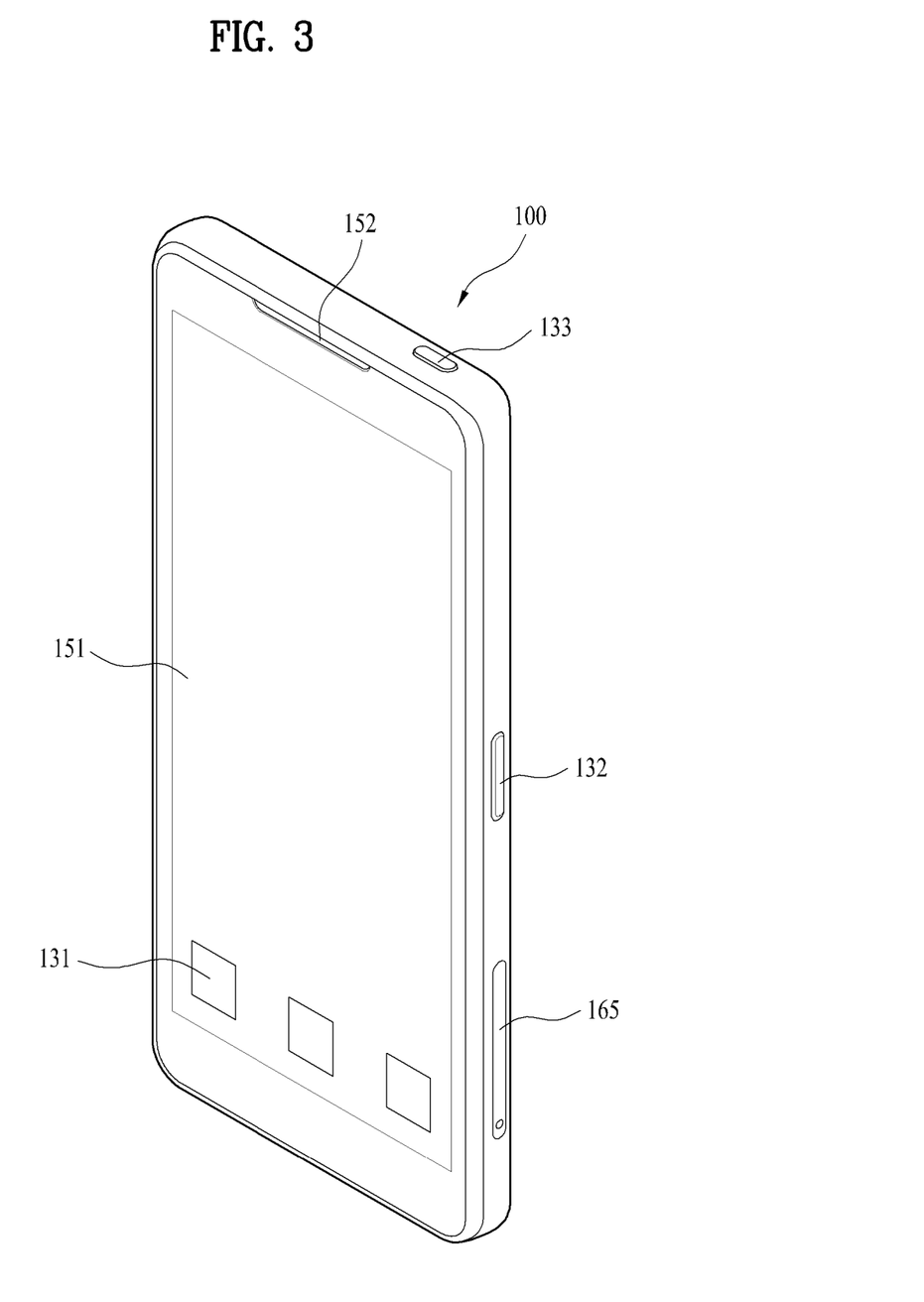
FIG. 3 is a rear side perspective diagram for a mobile terminal according to one embodiment of the present invention.

FIG. 2 is a front perspective diagram of a mobile terminal according to one embodiment of the present invention and FIG. 3 is a front perspective diagram of a mobile terminal according to a different embodiment of the present invention.

The mobile terminal 100 will generally include a case forming the appearance of the terminal. In this embodiment, the case is formed using a front case 101 and a rear case 102. Various electronic components are incorporated into a space formed between the front case 101 and the rear case 102.

The cases 101, 102, 103 may be formed by injection-molding synthetic resin or may be formed of a metal, for example, stainless steel (STS), aluminum (Al), titanium (Ti), or the like.

A display unit 151, an audio output module 152, a camera 121, a user input unit 131/132, a microphone 122, an interface unit 170 and the like can be arranged at the cases 101/102 of the mobile terminal.

The display unit 151 occupies most part of a main surface of the front surface 101. The audio output module 152, the user input unit 131 and the like are arranged at the circumference of the display unit 151.

As shown in FIG. 2, the user input unit 131 positioned at the front side is separately mounted on the front side irrespective of the display unit 151 and can be configured in a form of a button pushed by physical pressure or a button on which an input is inputted via a touch sensor. Or, as shown in FIG. 3, the user input unit can receive a command input via a touch sensor in a manner of outputting a button on a part of the display unit 151.

In the former cases, the button can be positioned at the bottom or the top of the display unit 151 (refer to FIG. 2). In the latter case, since the button can be generated in any position of the display unit 151, a position of the user input unit 131 can be freely changed (refer to FIG. 3).

The user input unit 132, the microphone 122, the interface unit 171 and the like can be arranged at the sides of the front case 101 and the rear case 102.

Figure 4:
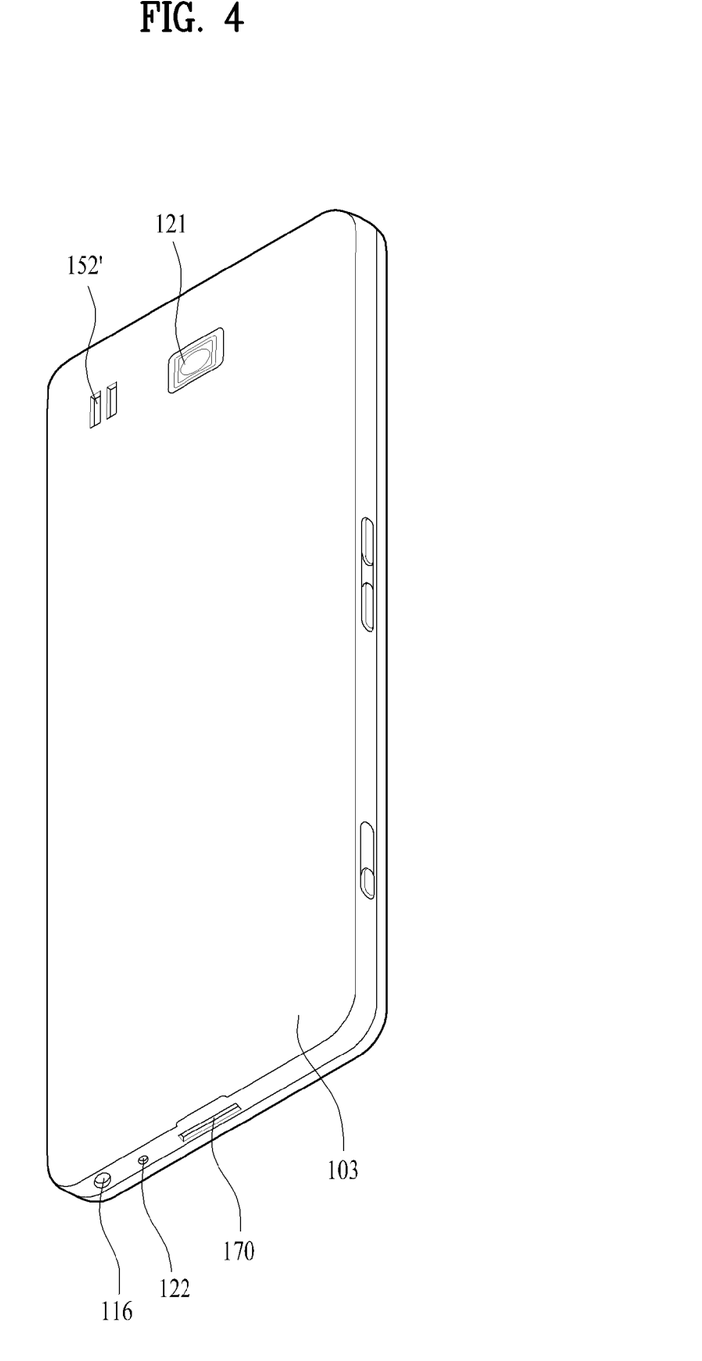
FIG. 4 is a perspective diagram for a shape of a camera of a mobile terminal facing the front side according to one embodiment of the present invention.

FIG. 4 is a rear perspective diagram of a mobile terminal shown in FIG. 2 or FIG. 3.

Referring to FIG. 4, an audio output module 152' can be additionally arranged at a rear side of a terminal body. The audio output module 152' arranged at the rear side of the terminal body can implement a stereo function together with the audio output module 152 arranged at the front side of the terminal body and the audio output module 152' can also be used for implementing a speaker mode in case of making a phone call.

An antenna 116 for receiving a broadcast signal can be additionally arranged at the side of the terminal body in addition to an antenna for making a phone call and the like. The antenna 116 forming a part of the broadcast receiving module 111 (refer to FIG. 1) can be installed in a form capable of being extended from the terminal body.

The camera 121 can be mounted on the rear side of the terminal body, in other word, the rear case 102. The camera 121 is facing a direction opposite to a direction at which the display unit 151 is facing. Hence, a user can capture an image inputted into the camera 121 while checking the image via the display unit 151.

Figure 5:
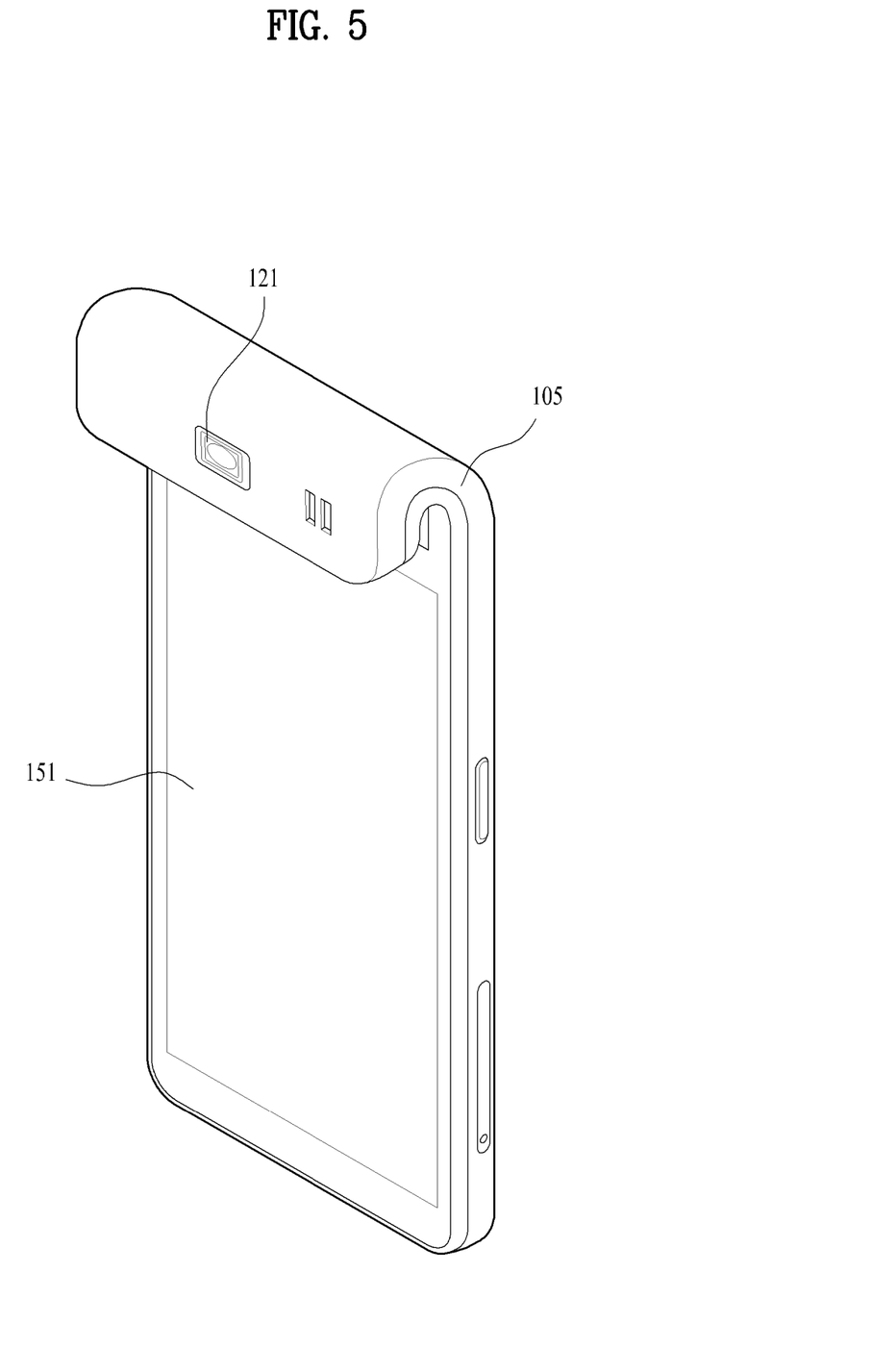
FIG. 5 is a perspective diagram for a first example of using a mobile terminal according to one embodiment of the present invention.

FIG. 5 is a perspective diagram for a shape of a camera of a mobile terminal facing the front side according to one embodiment of the present invention.

Referring to FIG. 5, at least a part of cases 101/102/103 according to the present invention can be flexibly bent. In this case, the whole of the mobile terminal 100 can be bent or a specific part of the mobile terminal can be bent. In order to bend the whole of the mobile terminal, it is necessary to bend not only the cases but also a circuit board or a device embedded in the mobile terminal and the display unit 151.

The bending unit 105 can maintain an angle adjusted by a user. A user bends the bending unit 105 formed by such a member capable of being transformed and maintaining a shape of the bending unit as a plate spring, a wire and the like instead of a limp member such as paper and the bending unit can maintain the angle adjusted by the user.

In case of bending a part of the mobile terminal, a case of the mobile terminal can be bent to change a direction of the camera 121 facing a front side or a rear side of the mobile terminal to an opposite direction. In particular, among bending parts of the mobile terminal, a bending part configured to change the direction at which the camera 121 is facing is called the bending unit 105.

The direction at which the camera 121 is facing is changed to make the camera 121 to be positioned at a direction identical or opposite to a direction at which the display unit 151 is facing. In particular, in case of capturing a front side of a user, in order for the user to capture an image inputted into the camera 121 while checking the image via the display unit 151, the camera 121 should face a direction opposite to a direction at which the display unit 151 is facing. In case of capturing a user side, in particular, in case of capturing a selfie, the camera 121 should face the direction identical to the direction at which the display unit 151 is facing in order for the user to capture the image inputted into the camera 121 while checking the image via the display unit 151.

Referring to FIG. 5, the camera 121 is positioned at an opposite side of the display unit 151. In order to capture a selfie, the bending unit 105 is bent and the camera 121 faces a direction identical to a direction at which the display unit 151 is facing. On the contrary, if the camera 121 and the display unit 151 face an identical direction, it may bend the bending unit 105 to capture a front direction of a user.

When the bending unit 105 of the mobile terminal is positioned at one side of the display unit 151 to prevent the bending unit 105 and the display unit 151 from being overlapped with each other, as shown in FIG. 2, if a user input unit is positioned at a position blocked by the bending unit 105, it may be able to minimize a part of the display unit 151 blocked by the bending unit, although the bending unit 105 is bent.

As shown in FIG. 3, if the bending unit 105 and the display unit 151 are overlapped with each other, the display unit 151 can be bent as well. In this case, it may be able to use a case made up of a transformable material for the display unit. The display unit may have a bendable structure and use a flexible display.

In this case, if the display unit is bent by the bending unit 105, a part of the display unit 151 is blocked by a rear side of the mobile terminal. In this case, it may be able to control an image not to be displayed on the part of the display unit 151 blocked by the rear side of the mobile terminal. Instead, an image can be displayed on a part of the display unit, which is not blocked by the rear side of the mobile terminal. As shown in FIG. 3, when a user input unit positioned at the bottom of the display unit 151 corresponds to a touch type input unit implemented using a part of the display unit 151, if the bending unit 105 is bent, the user input unit is disappeared from the display unit and an image can be displayed on the display unit extended to an area of the user input unit. If necessary, the user input unit can be generated on the display unit 151.

If the bending unit 105 is bent, an upside-down image of an image inputted from the camera 121 can be displayed on the display unit 151. In particular, since an up-and-down of the camera 121 is changed as the bending unit 105 is bent, the image inputted via the camera 121 is reversed. To this end, an image provided to the display unit 151 can be controlled to have images different from each other including an image provided before the bending unit 105 is bent and an image provided after the bending unit 105 is bent.

If a bending angle (θ) of the bending unit 105 equal to or greater than 90 degrees is detected using a sensor configured to detect bending of the bending unit 105, it may be able to recognized that a direction of an image inputted via the display unit and a direction of an image inputted via the camera 121 are identical to each other. Hence, the image inputted via the camera can be displayed on the display unit 151 in reverse or can be stored in the storage unit. The sensor configured to detect the bending of the bending unit can include a proximity sensor, a gyro sensor, a gravity sensor and the like.

Figure 6:
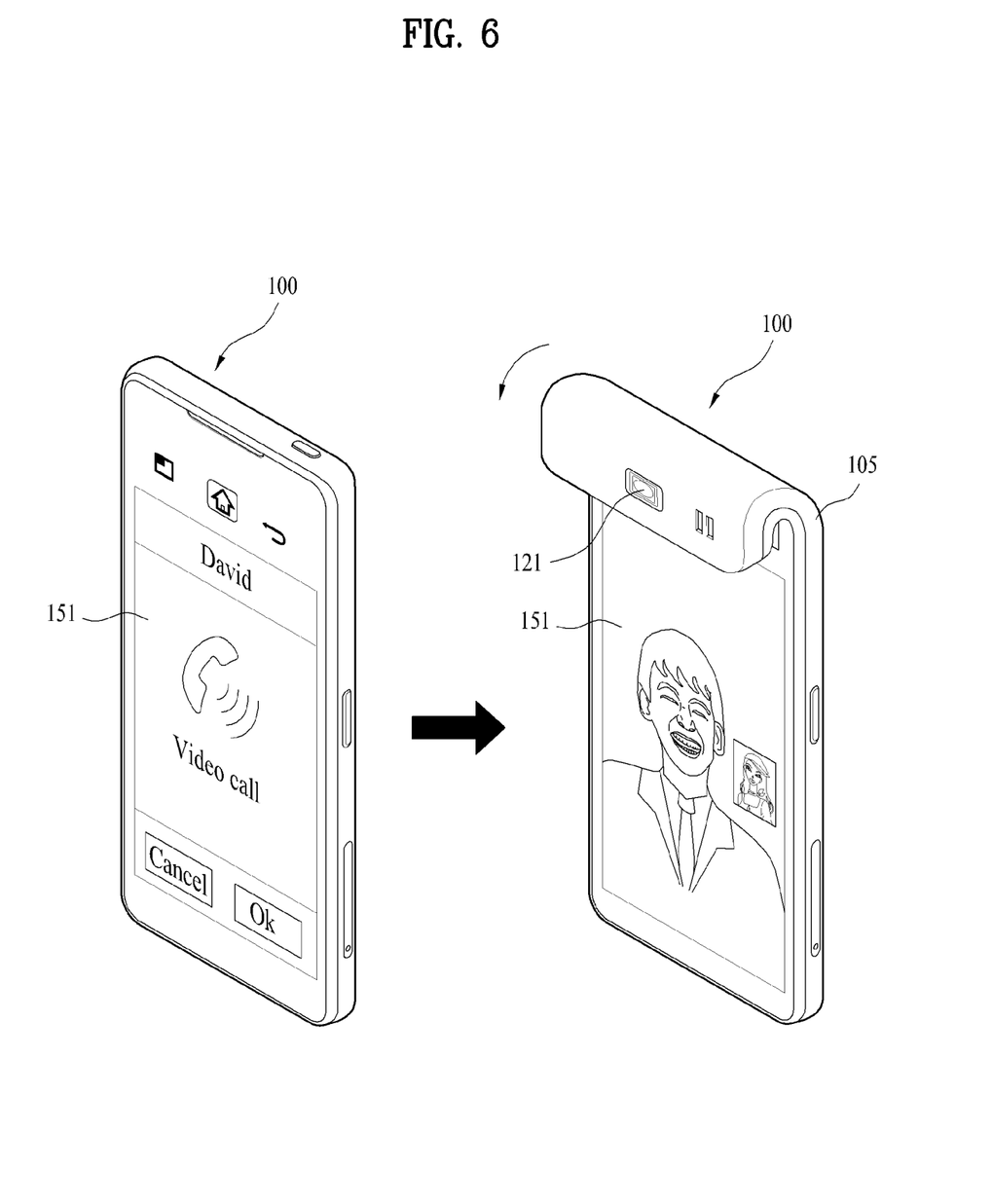
FIG. 6 is a perspective diagram for a second example of using a mobile terminal according to one embodiment of the present invention.
Figure 7:
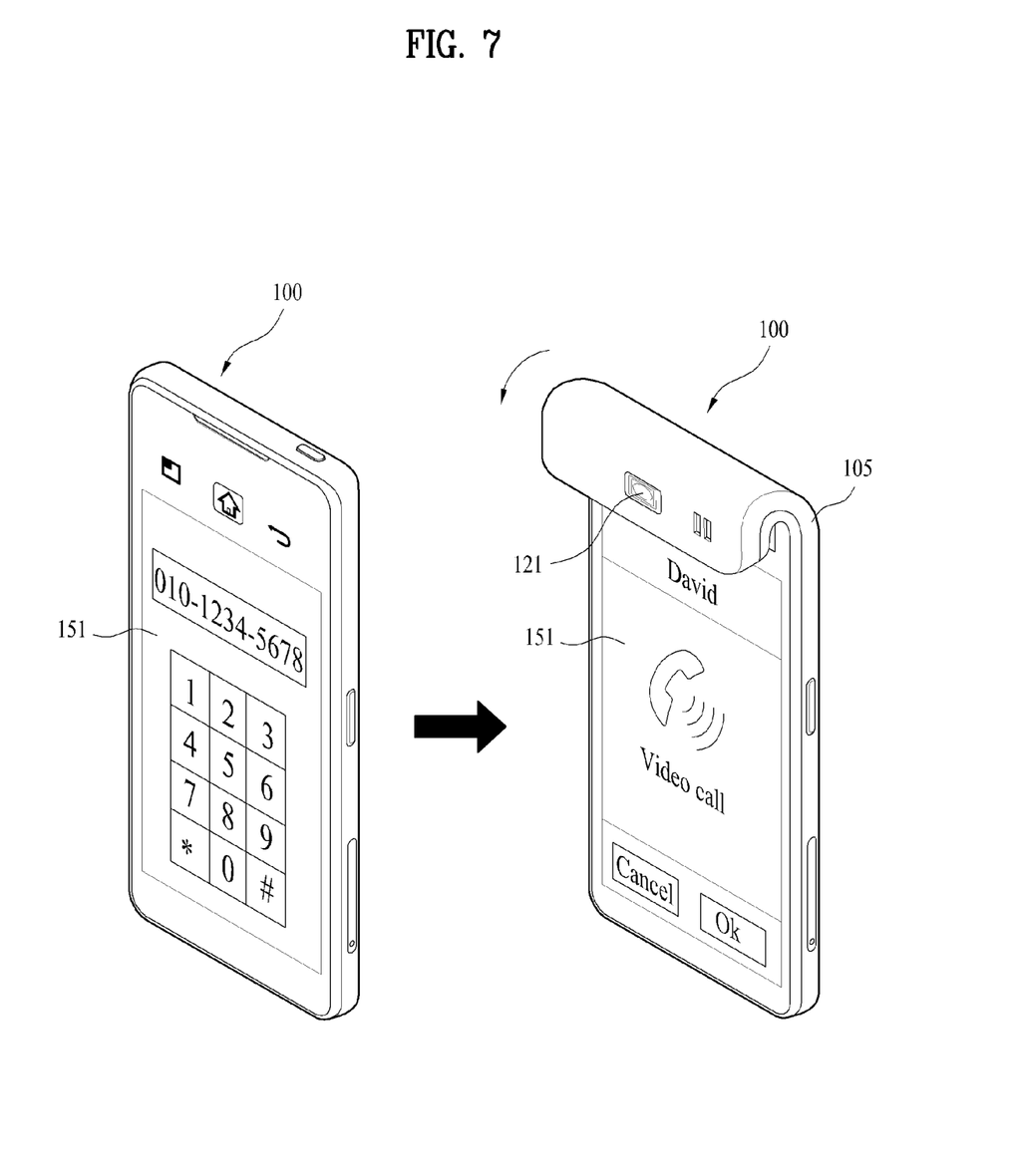
FIG. 7 is a perspective diagram for a third example of using a mobile terminal according to one embodiment of the present invention.
Figure 8:
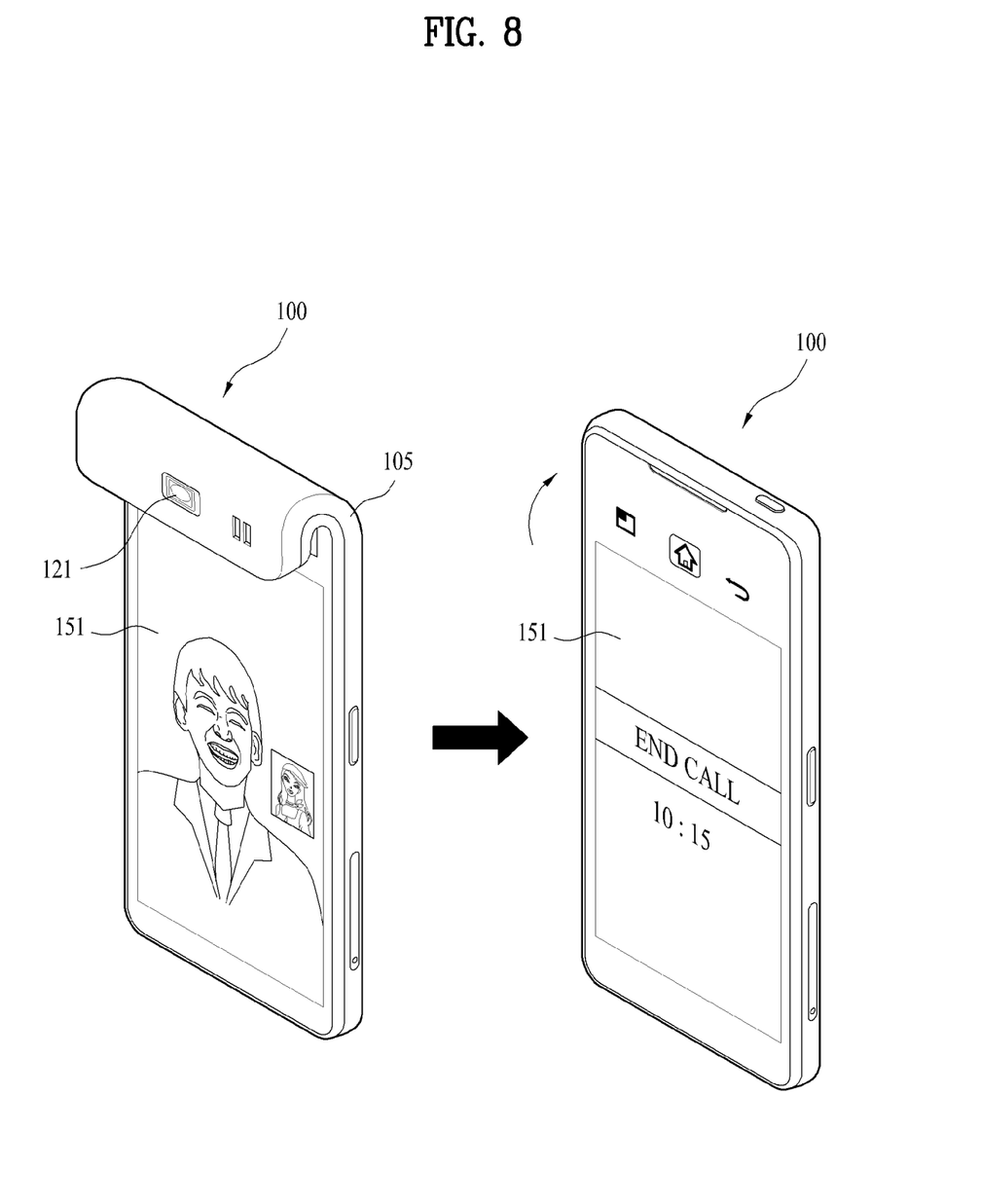
FIG. 8 is a perspective diagram for a fourth example of using a mobile terminal according to one embodiment of the present invention.

FIGS. 6 to 8 are diagrams for a method of controlling a mobile terminal using the bending unit 105 in case of making a video call.

As shown in FIG. 6, when a video call is received, the camera 121 should face a user to capture a face of the user. Hence, if the bending unit 105 is bent and the camera 121 is positioned at a direction facing the user, it may be able to control the video call to be immediately connected.

As shown in FIG. 7, when a user intends to make a video call, if the user inputs a telephone number of a counterpart to a mobile terminal and bends the bending unit 105, it may be able to control the video call to be connected. The aforementioned embodiment can be performed irrespective of an order. In particular, if the user makes a call while the bending unit 105 is bent, the user can make a video call.

As shown in FIG. 8, if the bending unit 105 is unbent in the middle of a video call, since a face of a user is not captured anymore, it may be able to control the video call to be terminated.

Figure 9:
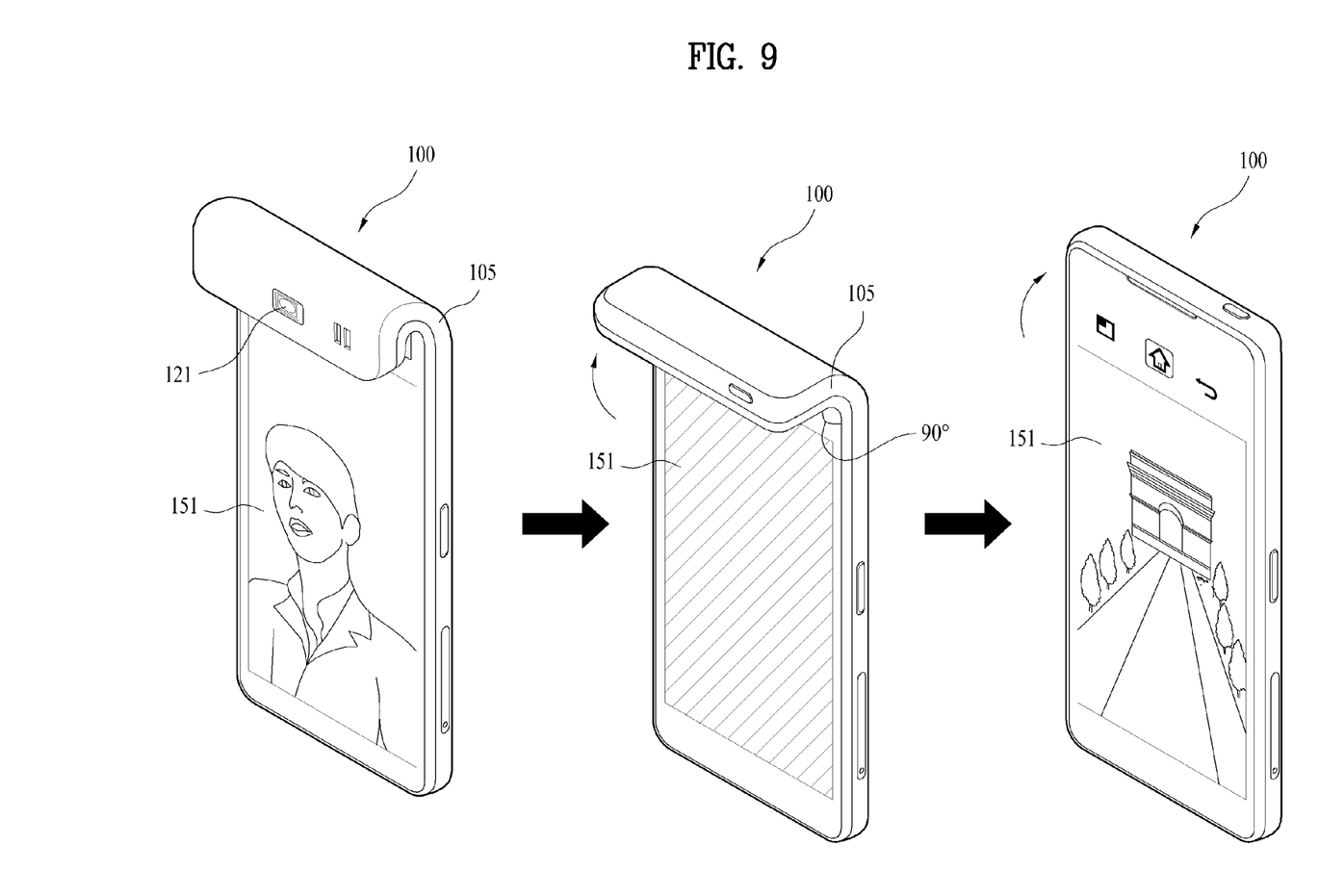
FIG. 9 is a perspective diagram for a fifth example of using a mobile terminal according to one embodiment of the present invention.

Referring to FIG. 9, when the camera 121 is activated in a camera capturing mode or a video call mode, if an angle of the bending unit 105 is changed, such an unnecessary image as an image of a ceiling and the like can be inputted in the middle of changing the angle of the bending unit. In particular, if the angle of the bending unit is changed in the middle of making a video call, it may make a counterpart of the video call dizzy. Hence, in order to prevent this, it may be able to control an image inputted in the camera 121 in the middle of changing the angle of the bending unit not to be displayed on the display unit 151 or not to be transmitted to the counterpart of the video call.

In order to distinguish a case of changing an angle on purpose to show an image captured on a specific angle from a case of normally changing the angle, it may be able to detect angle change speed and a changed angle. If an angle is rapidly changed and an image is captured in an angle position of which an angle of the bending unit 105 corresponds to an angle around 90 degrees, it may be able to control the image not to be displayed on the display unit 151 or not to be transmitted to the counterpart of the video call.

If an angle of the bending unit 105 corresponds to an angle around 90 degrees, an image of a ceiling part is captured and a reversed image can be captured. Hence, an image captured on an angle around 90 is not displayed on the display unit 151 or is not transmitted to the counterpart of the video call. Up and down of an image captured on an angle equal to or greater than 90 degrees is reversed.

In this case, a screen of the display unit can be displayed as a black screen or a still image of a lastly transmitted image can be displayed on the display unit 151 or can be transmitted to the counterpart of the video call until a next image is inputted.

Figure 10:
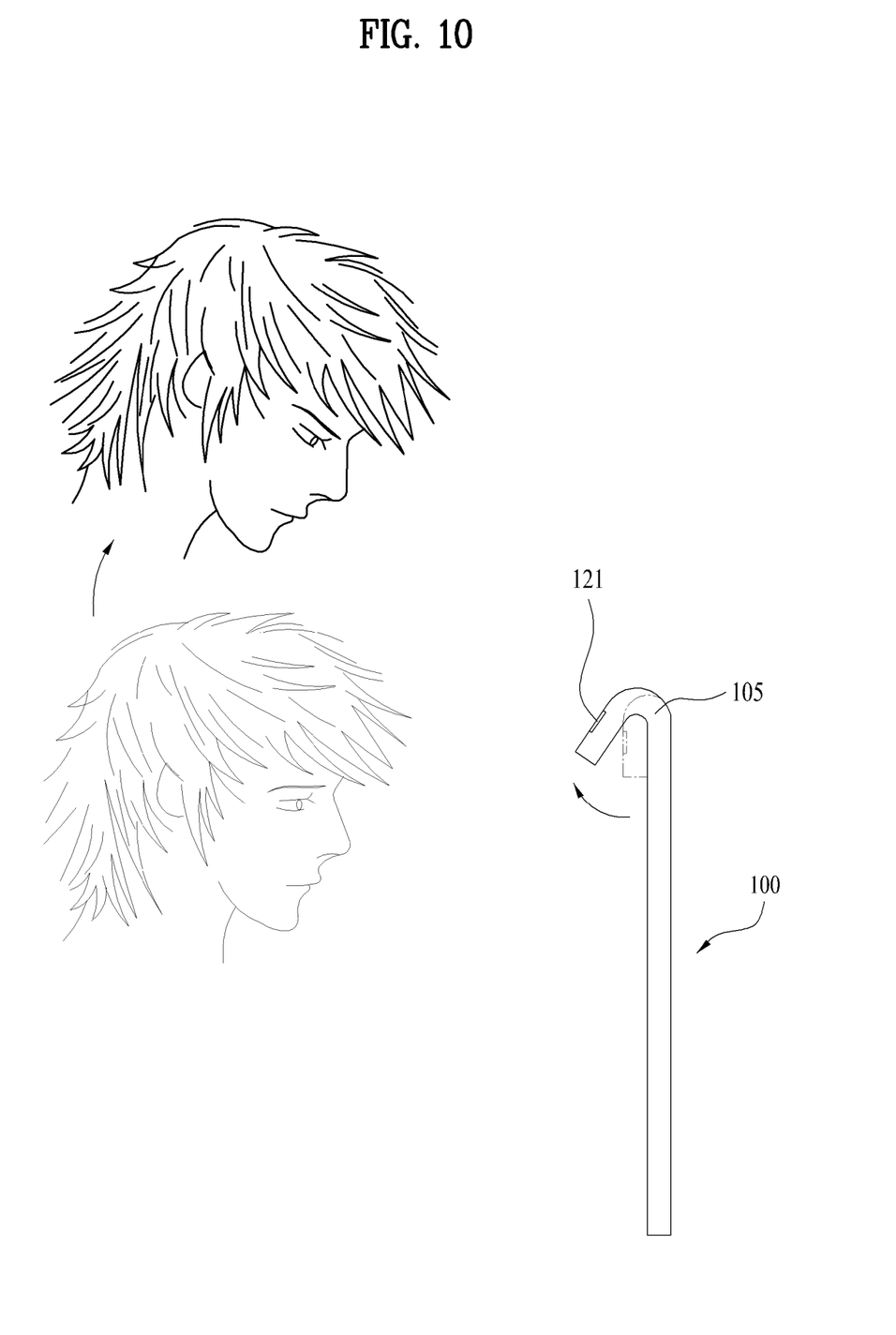
FIG. 10 is a perspective diagram for a fifth example of using a mobile terminal according to one embodiment of the present invention.

As shown in FIG. 10, an angle of the bending unit 105 may change according to a movement of a capturing object. For example, when a user puts a mobile terminal down and makes a video call while the user is moving, although the whole of the mobile terminal is unable to move along with the user, the angle of the bending unit 105 changes and may be able to constantly capture the user.

Or, in case of capturing a selfie, when the user is apart from the mobile terminal as far as a not reachable distance, since the bending unit 105 automatically catches an appearance of the user in a manner of changing the angle of the bending unit, it may be useful for capturing a selfie.

As mentioned in the foregoing description, the mobile terminal according to the present invention can capture a front image and a rear image using a single camera 121. Hence, since the number of cameras is decreased, it may be able to reduce component cost, utilize a space on which the camera 121 is mounted, and use a camera 121 of high resolution for capturing a selfie.

It will be apparent to those skilled in the art that various modifications and variations can be made therein without departing from the spirit and scope of the invention.

Thus, the foregoing embodiments are merely exemplary and are not to be considered as limiting the present disclosure. Thus, the scope of the present invention can be determined by rational interpretation of the attached claims and it is intended that the present invention covers the modifications and variations of this invention that come within the scope of the appended claims and their equivalents.

What is claimed is:

1. A mobile terminal, comprising:
a case of which at least a part of the case is flexible;
a camera configured to capture one direction in a manner of being mounted on one side of the case;
a display unit configured to display an image captured by the camera;
a bending unit configured to be bent to make the camera face another direction; and
a controller configured to control the camera according to change of an angle of the bending unit.

2. The mobile terminal of claim 1, wherein if the bending unit changes an angle as much as an angle equal to or greater than 90 degrees, the controller is configured to control the image captured by the camera to be stored in a storing unit or to be displayed on the display unit in a manner of reversing the image.

3. The mobile terminal of claim 1, further comprising a user input unit positioned at a rear side of the camera.

4. The mobile terminal of claim 1, wherein if a part of the display unit is blocked by the bending unit as the bending unit is bending, the display unit is configured to display an imaged on a part not blocked by the bending unit only.

5. The mobile terminal of claim 1, further comprising a user input unit configured to receive an input using a touch input mode on the display unit,
wherein if the bending unit is bent and blocks a part of the display unit, the user input unit is configured to be disappeared from the display unit.

6. The mobile terminal of claim 1, wherein the display unit is made up of a flexible material and wherein both the case and the display unit are bent in a manner that the bending unit is overlapped with the display unit.

7. The mobile terminal of claim 1, wherein the display unit is mounted on another side of the case and wherein if a video call is received and the bending unit is bent to make the camera face another direction, the controller is configured to connect with a counterpart of the video call.

8. The mobile terminal of claim 1, wherein the display unit is mounted on another side of the case and wherein if a telephone number of a counterpart is inputted and the bending unit is bent to make the camera face another direction, the controller is configured to connect a video call with the counterpart.

9. The mobile terminal of claim 7, wherein if the bending unit is unbent, the video call is terminated.

10. The mobile terminal of claim 1, wherein if the bending unit is bent, the controller is configured to activate the camera.

11. The mobile terminal of claim 1, wherein the controller is configured to control capturing of the camera to be stopped in the middle of changing the angle of the bending unit.

12. The mobile terminal of claim 1, wherein if a capturing object is moving, the controller is configured to adjust the angle of the bending unit according to the movement of the object.

13. The mobile terminal of claim 1, wherein the bending unit is configured to maintain an angle adjusted by a user.

14. The mobile terminal of claim 1, wherein the bending unit comprises a plate spring.

15. The mobile terminal of claim 1, wherein both the case and the display unit are made up of a flexible material.

* * * * *